(12) United States Patent
Vandame et al.

(10) Patent No.: US 10,348,947 B2
(45) Date of Patent: Jul. 9, 2019

(54) PLENOPTIC IMAGING DEVICE EQUIPPED WITH AN ENHANCED OPTICAL SYSTEM

(71) Applicant: THOMSON Licensing, Issy-les-Moulineaux (FR)

(72) Inventors: Benoit Vandame, Betton (FR); Frederic Babon, Chateaubourg (FR); Valter Drazic, Betton (FR)

(73) Assignee: InterDigital CE Patent Holdings, Paris (FR)

( * ) Notice: Subject to any disclaimer, the term of this patent is extended or adjusted under 35 U.S.C. 154(b) by 0 days.

(21) Appl. No.: 15/697,364

(22) Filed: Sep. 6, 2017

(65) Prior Publication Data

US 2018/0067237 A1 Mar. 8, 2018

(30) Foreign Application Priority Data

Sep. 7, 2016 (EP) .................................. 16306119

(51) Int. Cl.
*H04N 5/225* (2006.01)
*G06T 7/55* (2017.01)
(Continued)

(52) U.S. Cl.
CPC ....... *H04N 5/22541* (2018.08); *G02B 3/0056* (2013.01); *G02B 3/0075* (2013.01);
(Continued)

(58) Field of Classification Search
CPC .............. G02B 3/0056; G02B 27/0075; G02B 13/0015; G02B 3/0075; G02B 13/0055;
(Continued)

(56) References Cited

U.S. PATENT DOCUMENTS 5,729,011 A * 3/1998 Sekiguchi ................. G01J 3/14
250/208.1
6,276,803 B1 * 8/2001 Aoyama ................ G02B 5/045
348/E5.139
(Continued)

FOREIGN PATENT DOCUMENTS

CN 204258928 4/2015
EP 3007228 4/2016
(Continued)

OTHER PUBLICATIONS

Chen et al., "Panoramic stereo photography based on single-lens with a double-symmetric prism", Optics Express, vol. 21, No. 7, Mar. 29, 2013, pp. 1-9.
(Continued)

*Primary Examiner* — Shahbaz Nazrul
(74) *Attorney, Agent, or Firm* — Brian J. Dorini; Patricia A. Verlangieri (57) ABSTRACT

A plenoptic imaging device is described including a micro-lens array placed between a main lens and a photosensor. The micro-lens array has a plurality of micro-lenses each configured to project a micro-image onto the photosensor, the main lens covering a central field-of-view of the scene according to capture axis. The plenoptic imaging device includes multi-faceted optical means structure having at least two facets and placed in a plane adjacent to the aperture diaphragm plane and centered on the main optical axis, each facet being configured to angularly rotated the capture axis with respect to the main optical axis so as to capture a rotated field-of-view from the central field-of-view, and so that the captured rotated field-of-views form an expanded field-of-view covering the central field-of-view.

8 Claims, 7 Drawing Sheets

(51) Int. Cl.
  *G02B 3/00* (2006.01)
  *G02B 13/00* (2006.01)
  *G02B 27/00* (2006.01)
  *G06T 7/557* (2017.01)
  *H04N 13/232* (2018.01)

(52) U.S. Cl.
  CPC ..... *G02B 13/0015* (2013.01); *G02B 13/0055* (2013.01); *G02B 27/0075* (2013.01); *G06T 7/557* (2017.01); *H04N 5/2254* (2013.01); *H04N 13/232* (2018.05); *H04N 5/2259* (2013.01)

(58) Field of Classification Search
  CPC ... H04N 13/232; H04N 5/2254; H04N 5/2259
  See application file for complete search history.

(56) References Cited

U.S. PATENT DOCUMENTS

| | | | |
|---|---|---|---|
| 6,483,535 | B1 | 11/2002 | Tamburrino et al. |
| 7,620,309 | B2 | 11/2009 | Georgiev |
| 8,290,358 | B1* | 10/2012 | Georgiev ............... G03B 35/10 396/326 |
| 9,902,120 | B2* | 2/2018 | Chen ................. B29D 11/0074 |
| 2006/0215054 | A1 | 9/2006 | Liang et al. |
| 2007/0230944 | A1* | 10/2007 | Georgiev ............. H04N 5/2254 396/322 |
| 2007/0242946 | A1* | 10/2007 | Toyoda ................. G02B 13/06 396/322 |
| 2009/0041448 | A1* | 2/2009 | Georgiev ............... H04N 5/225 396/268 |
| 2013/0222633 | A1 | 8/2013 | Knight et al. |
| 2016/0241840 | A1* | 8/2016 | Kim ................... G02B 27/0075 |
| 2016/0295087 | A1 | 10/2016 | Oberdorster |
| 2017/0374253 | A1* | 12/2017 | Cahall ................. H04N 5/2254 |

FOREIGN PATENT DOCUMENTS

| | | |
|---|---|---|
| JP | 2012129654 | 7/2012 |
| JP | 2014066897 | 4/2014 |
| WO | WO2015091509 | 6/2015 |

OTHER PUBLICATIONS

Chen, C. Y., "Image Stitching—Comparisons and New Techniques", The University of Auckland CITR at Tamaki, Computer Science Department, Technical Report CITR-TR-30, Oct. 1998, pp. 1-31.

Lu et al., "3D and Image Stitching With the Lytro Light-Field Camera", City College of City University of New York, Department of Computer Science, Technical Report, May 22, 2013, pp. 1-19.

Putman et al., "Manufacture and use of a Shack-Hartmann sensor with a multifaceted prism for simultaneous sensing of multiple wavefronts", Proceedings of SPIE, Advancements in Adaptive Optics, vol. 5490, Oct. 24, 2004, pp. 1138-1145.

Bonakdar et al., "High-throughput realization of an infrared selective absorber/emitter by DUV microsphere projection lithography", Nanotechnology, vol. 27, Dec. 9, 2015, pp. 1-7.

Boriskin et al., "Device for forming at least one focused beam in the near zone, from incident electromagnetic", European Patent Application No. 16305342.4, Mar. 24, 2016, pp. 1-76.

* cited by examiner

Figure 1

Prior Art

Figure 2

Prior Art

PLENOPTIC IMAGING DEVICE EQUIPPED WITH AN ENHANCED OPTICAL SYSTEM

1. REFERENCE TO RELATED EUROPEAN APPLICATION

This application claims priority from European Patent Application No. 16306119.5, entitled "PLENOPTIC IMAGING DEVICE EQUIPPED WITH AN ENHANCED OPTICAL SYSTEM," filed on Sep. 7, 2016, the contents of which are hereby incorporated by reference in its entirety.

2. TECHNICAL FIELD

The present disclosure relates to light-field imaging. More particularly, the disclosure pertains to technologies for acquiring and processing light-field data. More specifically, the present disclosure relates to plenoptic imaging device design.

3. BACKGROUND

The present section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Conventional image capture devices render a three-dimensional scene onto a two-dimensional sensor. A conventional capture device captures a two-dimensional (2D) image representing an amount of light that reaches each point on a photosensor within the device. However, this 2D image contains no information about the directional distribution of the light rays that reach the photosensor (may be referred to as the light-field). Depth, for example, is lost during the acquisition. Thus, a conventional capture device does not store most of the information about the light distribution from the scene.

Light-field capture devices (also referred to as "light-field data acquisition devices") have been designed to measure a four-dimensional light-field of the scene by capturing the light from different viewpoints of that scene. Thus, by measuring the amount of light traveling along each ray of light that intersects the photosensor, these devices can capture additional optical information (information about the directional distribution of the bundle of light rays) for providing new imaging applications by post-processing. The information acquired by a light-field capture device is referred to as the light-field data. Light-field capture devices are defined herein as any devices that are capable of capturing light-field data.

Light-field data processing comprises notably, but is not limited to, generating refocused images of a scene, generating perspective views of a scene, generating depth maps of a scene, generating extended depth of filed (EDOF) images, generating stereoscopic images, and/or any combination of these.

There are several types of light-field capture devices, among which:
plenoptic devices (or plenoptic cameras), which use a micro-lens array placed between the photosensor and the main lens, as described for example in document US 2013/0222633;
a camera array, where all cameras image onto a single shared image sensor or different image sensors.

The present disclosure focuses more precisely on plenoptic cameras, which are gaining a lot of popularity in the field of computational photography. Such cameras have novel post-capture processing capabilities. For example, after the image acquisition, the point of view, the focus or the depth of field can be modified. Also, from the obtained sampling of the light-field, the scene depth can be estimated from a single snapshot of the camera.

Figure 1:
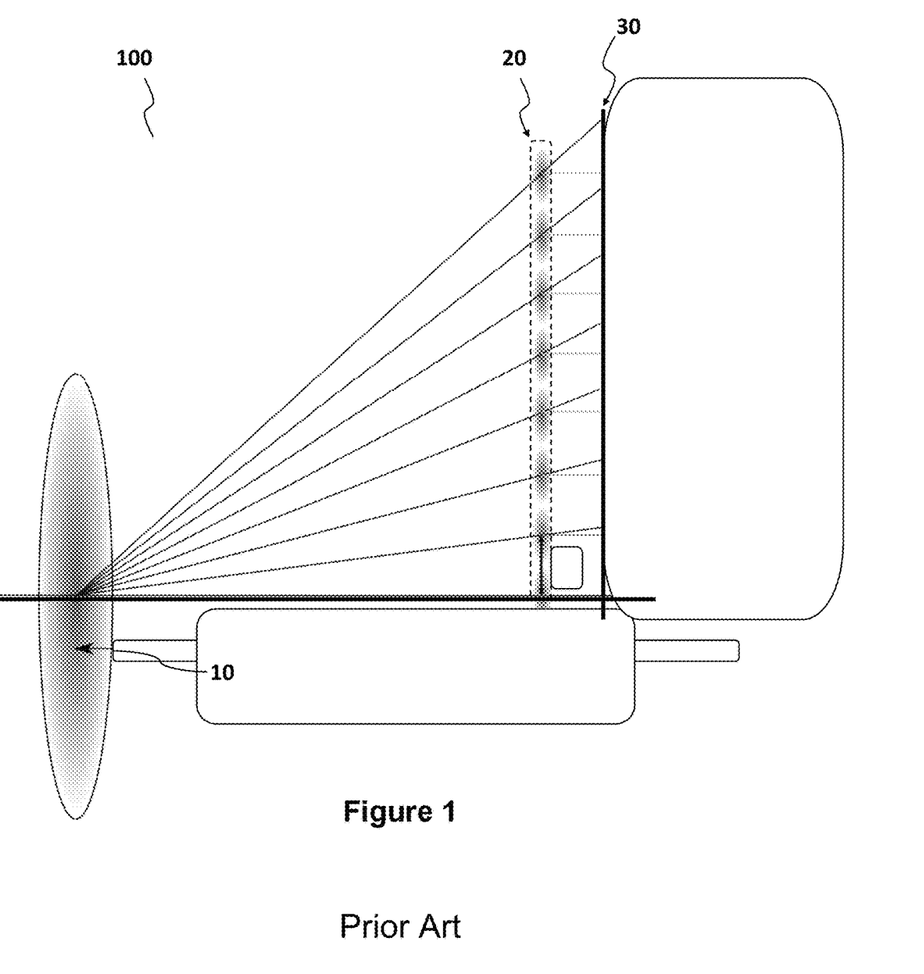
FIG. 1, already described with reference to the prior art, presents an example of structure of a conventional plenoptic imaging device.

As schematically illustrated in FIG. 1, a plenoptic camera 100 uses a micro-lens array 20 positioned in the image plane of the main lens 10 and in front of a photosensor 30 on which one micro-image per micro-lens is projected (also called "sub-image" or "micro-lens image"). The photosensor 30 is a pixel array positioned in the image plane of the micro-lens array 20. The micro-lens array 20 comprises a plurality of micro-lenses uniformly distributed, usually according to a quincunx arrangement.

Figure 2:
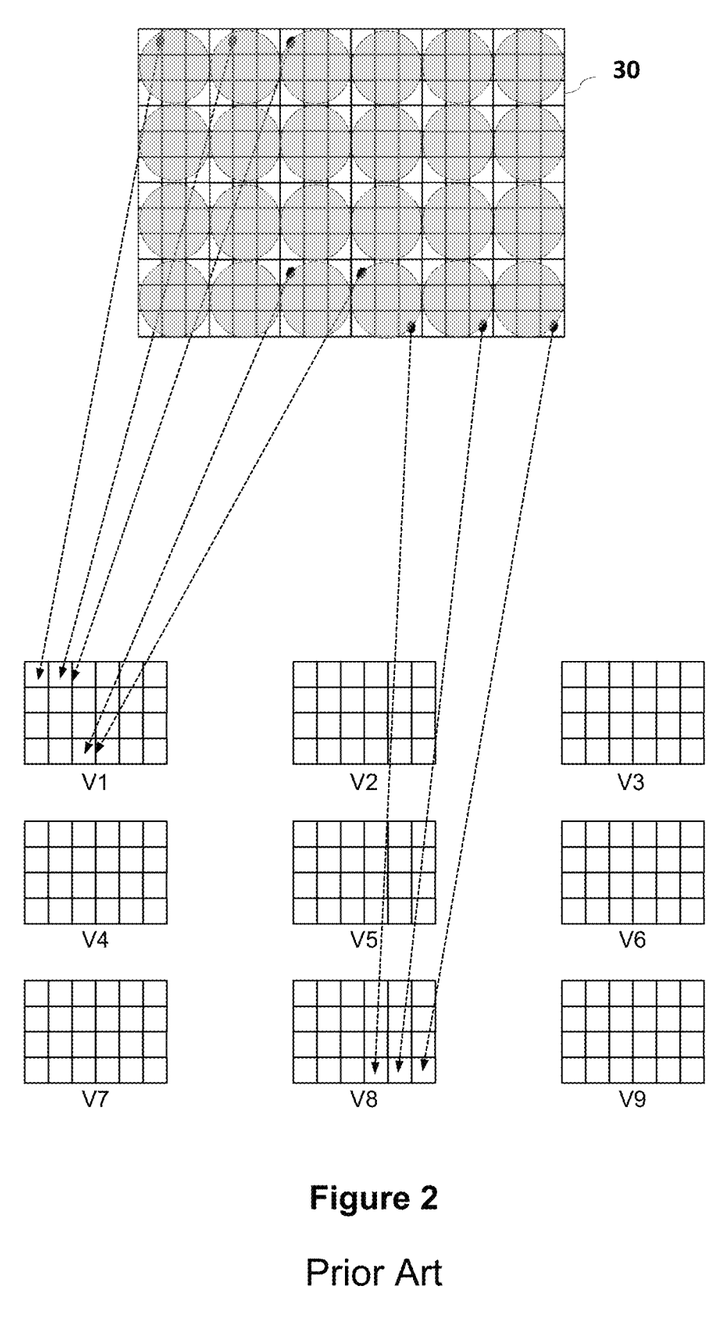
FIG. 2, already described with reference to the prior art, depicts an example of a distribution of micro-images on the photosensor of a conventional plenoptic imaging device and views of a same scene seen under different viewing angles obtained after de-multiplexing by such a device.

FIG. 2 shows an example of the distribution of micro-lens images projected by a micro-lens array onto the photosensor 30. The photosensor 30 comprises a plurality of rows and columns of pixels, and each micro-image projected onto the photosensor 30 have a diameter equal to three pixels of the photosensor 30.

A plenoptic camera is designed so that each micro-lens image depicts a certain area of the captured scene and each pixel associated with that micro-lens image depicts this certain area from the point of view of a certain sub-aperture location on the main lens exit pupil.

The raw image of the scene obtained as a result is the sum of all the micro-images acquired from respective portions of the photosensor 30. This raw image contains the angular information of the light-field. Angular information is given by the relative position of pixels in the micro-images with respect to the centre of these micro-images. Based on this raw image, the extraction of an image of the captured scene from a certain point of view (also called "de-multiplexing") is performed by reorganizing the pixels of this raw image in such a way that all pixels capturing the scene with a certain angle of incidence are stored in a same pixel grid (also commonly called "view" or "sub-aperture image"). Each view gathers, in a predefined sequence, the pixels of the micro-images having the same relative position with respect to their respective centre (i.e. the pixels which are associated with a same given angle of view), thereby forming a pixel mosaic. Each sub-aperture image therefore has as many pixels as micro-lenses comprised in the micro-lens array 20 and there are usually as many sub-aperture images as pixels per micro-image.

For example, each micro-lens image of FIG. 2 covers at least partially nine pixels, thus allowing the generation of nine views (V1, V2, . . . , V9) of the captured scene, each view corresponding to the scene seen from a particular viewing angle.

In any imaging device, image quality of images captured is a critical parameter. A main lens is a more or less complex optical system composed of a plurality of lenses designed to image an object on the photosensor. Conventional optical systems possess inherent aberrations that degrade the quality of images formed by the optical system and acquired by the photosensor. Optical aberrations are mainly due to the convergence of rays of light passing through the optical system, depending on different well-known parameters.

The image sharpness characterizes the quality of an optical system. The optical systems are designed such that the images formed on the photosensor are as sharp as possible for the range of visible wavelengths and throughout the full field of view.

The point spread function (PSF) is typically used to characterize the optical quality of the main-lens of the imaging device. It describes the impulse response of a focused optical system to a point source or point object. The optical systems are designed so that, for given focus and aperture parameters, a point object in the object plane is imaged to a light spot (also commonly called "spot-diagram") having an extent smaller than a given number of pixels on the photosensor. Due to the optical aberrations of the main-lens, the spot diagram is not, in practice, equal to a Dirac function but spreads over several pixels.

Figure 3:
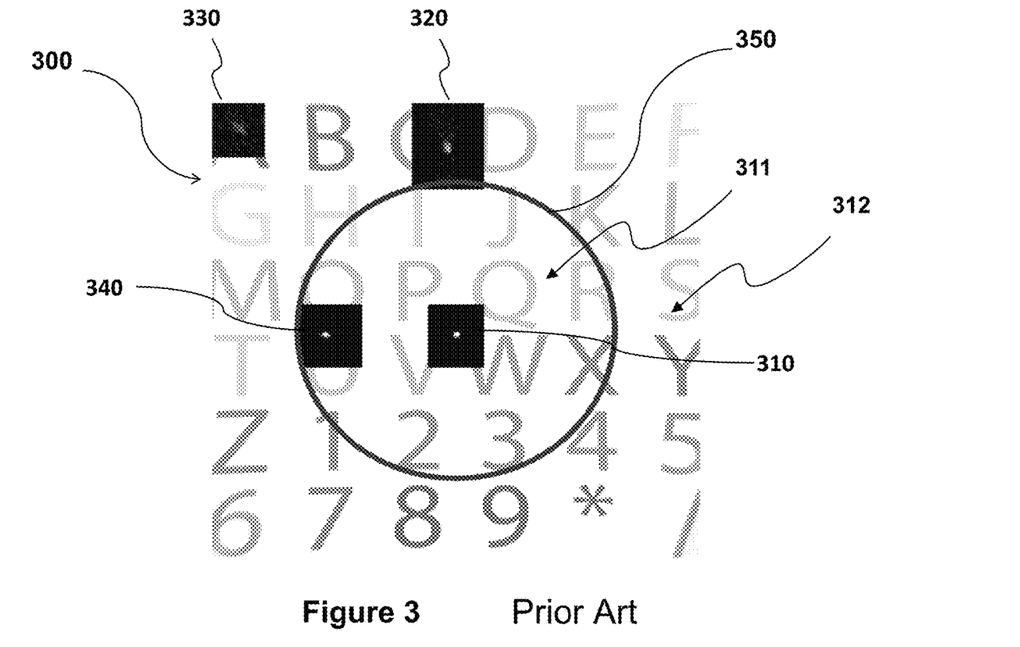
FIG. 3, already described with reference to the prior art, depicts an example of image captured using a conventional plenoptic imaging device showing the impact of optical aberrations of the optical system on the image sharpness.

FIG. 3 shows an example of an image 300 captured by a conventional imaging device using a basic wide-angle main-lens. The image 300 represents a part of a test pattern.

As illustrated, the image formed by the main-lens on the photosensor does not have the same image quality from the center to peripheral regions of the image. The further an image point is from the center of the image, the more spread the corresponding PSF spot diagram is. The black boxes 310, 320, 330, 340 illustrate the PSF spot-diagrams obtained by the main-lens a different location on the photosensor: box 310 is located in the center of the photosensor; boxes 320, 330 are located in peripheral regions of the photosensor; box 340 is located in an intermediate central region. Black boxes have been superposed to the image 300. The dotted circle 350 delimits a central area 311 of the image 300 in which the image is considered to be sharp (concentrated light spots 310 and 340) and a peripheral area 312 in which the image lacks sharpness (spread light spots 320 and 330). The further from the center of the image is, the more degraded the image sharpness it is. This shows that the main-lens 110 inherently suffers optical aberrations in peripheral regions that affect the image quality particularly at the edges of the image, resulting a lack of acutance at these areas of image.

There is therefore a need for enhancing the quality of images obtained by such an optical system.

4. SUMMARY OF THE DISCLOSURE

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A particular embodiment of the invention proposes a plenoptic imaging device comprising a plenoptic imaging device comprising a micro-lens array placed between a main lens and a photosensor, said micro-lens array comprising a plurality of micro-lenses arranged in an image plane of the main lens, each micro-lens being configured to project a micro-image onto the photosensor, said main lens having a main optical axis and an aperture diaphragm plane, said main lens covering a field-of-view of a scene according to a capture axis centred on the main optical axis, called central field-of-view. The plenoptic imaging device is such that it comprises multi-faceted optical means having at least two facets and placed in a plane adjacent to the aperture diaphragm plane and centred on the main optical axis, each facet being configured to angularly rotated the capture axis with respect to the main optical axis so as to capture a rotated field-of-view from the central field-of-view, and so that the captured rotated field-of-views form an expanded field-of-view covering said central field-of-view.

The principle of the invention is to capture an expanded field-of-view of the scene composed of multiple field-of-views rotated from the central field-of-view, each rotated field-of-view being imaged by the main lens as if it is centred on the main optical axis. Therefore, each of the rotated field-of-views allows imaging a portion of the scene with reduced or without optical aberration. Multiple decentred images of the scene can be thus obtained and, thanks to plenoptic imaging configuration, a composite image of these decentred images can be reconstituted, such composite image being of enhanced quality. Contrary to the prior art in which the peripheral portion of the image usually lacks sharpness, such a composite image has a good level of sharpness from the center to peripheral regions of the image. Thus, the invention provides a solution that improves the quality of image using a plenoptic device.

According to a particular feature, each micro-lens covers at least partially an integer number of pixels of the photosensor, said multi-faceted optical means comprising a number of facets lower than or equal to said integer number of pixels.

According to a particular feature, each micro-lens is configured to project micro-images onto the photosensor such that a distance between two successive micro-images projected onto the photosensor is equal to square root of said integer number of pixels.

According to a particular feature, the photosensor comprises an ordered array of pixels arranged according to a geometric scheme and the facets of said multi-faceted optical means are geometrically arranged as a function of said geometric scheme.

According to a particular feature, said multi-faceted optical means comprise a multi-facet prismatic element having a base and at least two lateral facets starting from said base and meeting at an apex, said apex passing through the main optical axis.

According to a particular feature, said multi-faceted optical means comprise a multi-facet prismatic element having a base and at least two lateral facets starting from said base and meeting at a central facet, said central facet being arranged perpendicularly to and passing through the main optical axis.

According to a particular feature, each facet of said multi-facet prismatic element forms an angle with said base that depends on:
  a refraction index of the multi-facet prismatic element,
  the distance between two successive micro-images projected onto the photosensor,
  a dimensional parameter of the photosensor,
  a main lens focal distance.

The use of facets suitably oriented allows suitably capturing the different rotated field-of-views necessary to the reconstitution of a good quality image of the scene.

According to a particular feature, the plenoptic imaging device comprises a unit for:
  extracting sub-images from a light-field content resulting from the rotated field-of-views captured on the photosensor via the micro-lens array, each sub-image being associated with one distinct of said rotated field-of-views, forming a composite image of the scene based on said extracted sub-images.

5. LIST OF FIGURES

Other features and advantages of embodiments of the invention shall appear from the following description, given by way of an indicative and non-exhaustive examples and from the appended drawings, of which.

5. DETAILED DESCRIPTION

In all of the figures of the present document, identical elements are designated by the same numerical reference sign.

As it will be described more fully hereafter with reference to the accompanying figures, it is proposed in one aspect of the present disclosure to capture an expanded field-of-view of a scene using a plenoptic imaging device, to improve quality of the image captured. This disclosure may, however, be embodied in many alternate forms and should not be construed as limited to the embodiments set forth herein. Accordingly, while the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure as defined by the claims. Like numbers refer to like elements throughout the description of the figures.

It will also be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

While not explicitly described, the present embodiments and variants may be employed in any combination or sub-combination.

Figure 4:
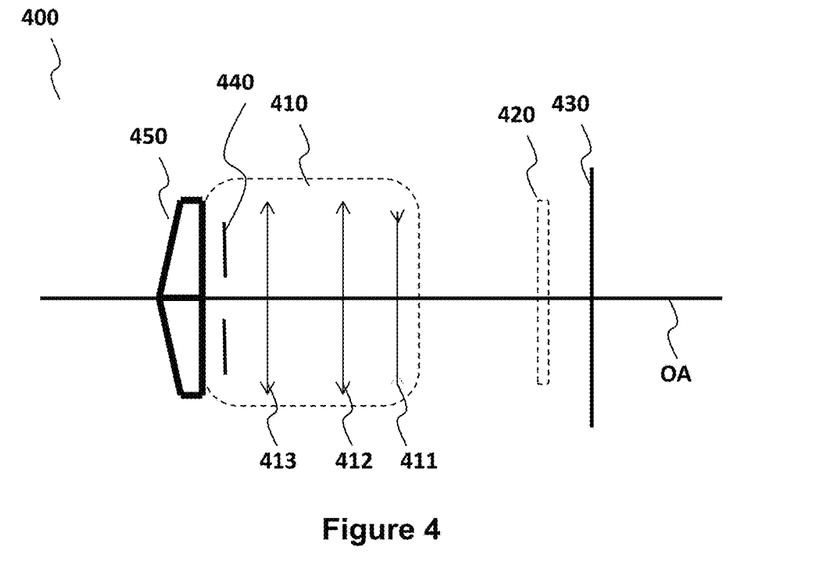
FIG. 4 depicts a simplified schema of a plenoptic imaging device according to a particular embodiment of the present disclosure.

FIG. 4 illustrates a simplified example of a plenoptic imaging device 400 according to a particular embodiment of the present disclosure. The plenoptic imaging device 400 comprises a micro-lens array 420 placed between a main lens 410 and a photosensor 430.

The micro-lens array 420 comprises a plurality of micro-lenses arranged in the image plane of the main lens 420. The micro-lens array 420 comprises M rows and N columns according to a rectangular-shaped geometric scheme (lattice). Each micro-lens has a bottom with a substantially circular contour and is configured to project a circular micro-image onto the photosensor 430 and coverfs a number of pixels (k) of the photosensor 430. In the example illustrated on FIG. 6, each micro-lens covers four pixels of the photosensor 430 (k=4): 2 pixels per row ($p_x$=2) and ($p_y$=2) pixels per columns (i.e. $k = p_x \times p_y = 4$).

For the present invention, it should be noted that each micro-lens of the micro-lens array shall be configured to cover an integer number of pixels (k).

The photosensor 430 uses for example a CCD (Charge-Coupled Device) or CMOS (Complementary Metal Oxide Semiconductor) technology. The photosensor 430 consists of an ordered array of RGB pixels arranged according to a rectangular-shaped geometric scheme, (or lattice) with W pixels in width and H pixels in height.

Other geometric schemes (lattices) can be implemented for the pixel array of photosensor and the micro-lens array without departing from the scope of the invention, on the condition that the geometric schemes of micro-lens array and that of photosensor are identical and oriented in the same direction. This condition allows sub-aperture images to be extracted more easily. For the micro-lens shape, it is no impact on the implementation of the invention and can be of different shapes (circular, rectangular, hexagonal, etc.).

Figure 5:
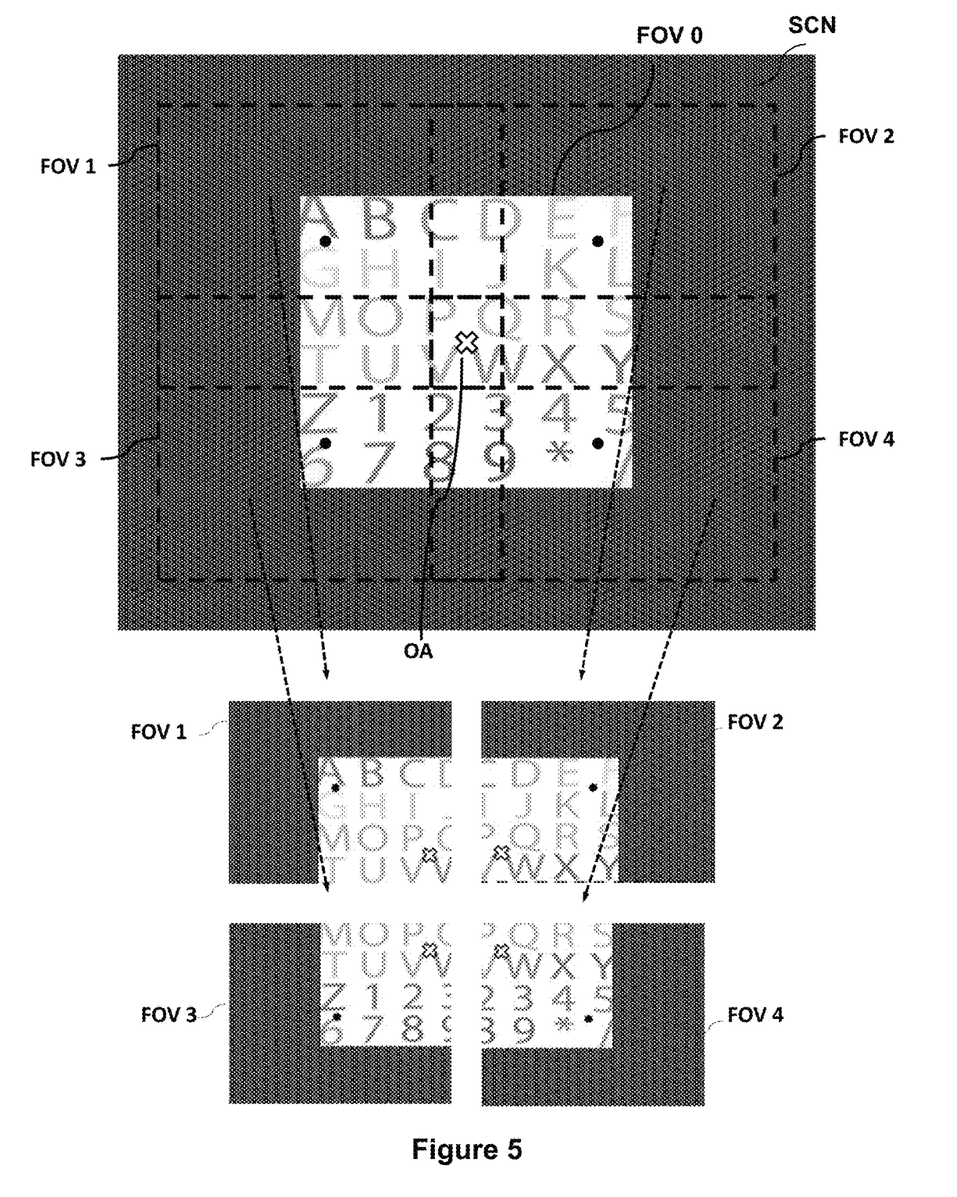
FIG. 5 depicts an example of a scene captured using the plenoptic imaging device of FIG. 4.

The main lens 410 is an optical system composed of a set of three glass lenses 411, 412, 413 and an aperture diaphragm 440 arranged on a main optical axis (referred to as OA on the figures). The aperture diaphragm 440 is placed in an optical plane so-called aperture diaphragm plane. The main lens 410 is, for example, a wide-angle objective which covers a field-of-view of a scene SCN with a given wide angle-of-view as illustrated in FIG. 5. An angle-of-view is defined as being the angular extent of a given scene that is imaged by the imaging device and depends on the value of used focal and photosensor dimensions.

Basically, the main lens 410 is designed to image the scene SCN according to an image-capture direction (or capture axis) that matches the optical axis OA of the main lens 410. The field-of-view covered by the main lens 410 is centered on the main optical axis; it is hereafter called the central field-of-view. The main optical OA axis is marked with a white cross on the figure. FOV 0 refers to the central field-of-view that the imaging device 400 is supposed to cover without multi-facet prismatic element.

According to a particular embodiment of the present disclosure, the plenoptic imaging device 400 comprises multi-faceted optical means placed in front of the main lens 410 as closed to the diaphragm plane 440 and centred on the main optical axis OA. For example, in the configuration illustrated here in relation with FIG. 4, the multi-faceted optical means 450 consist of a multi-facet prismatic element 450 positioned at the entrance aperture of the main lens 410. The multi-facet prismatic element 450 comprises four facets designed to split the pupil of the main lens 410 and create simultaneously four field-of-views of the scene SCN which are each angularly rotated from the main optical OA and which allow covering a field-of-view more expanded than the central field-of-view FOV-0. The number of facets (m) here is equal to the number of pixels (k) per micro-lens (i.e. m=k=2×2=4).

While the multi-facet prismatic element 450 discussed hereabove as being located at the entrance aperture of the main lens 410, the present disclosure is not limited to this example. The multi-facet prismatic element 450 can be provided at any plane adjacent to the aperture diaphragm, advantageously, at the nearest of the aperture diaphragm.

Figure 7:
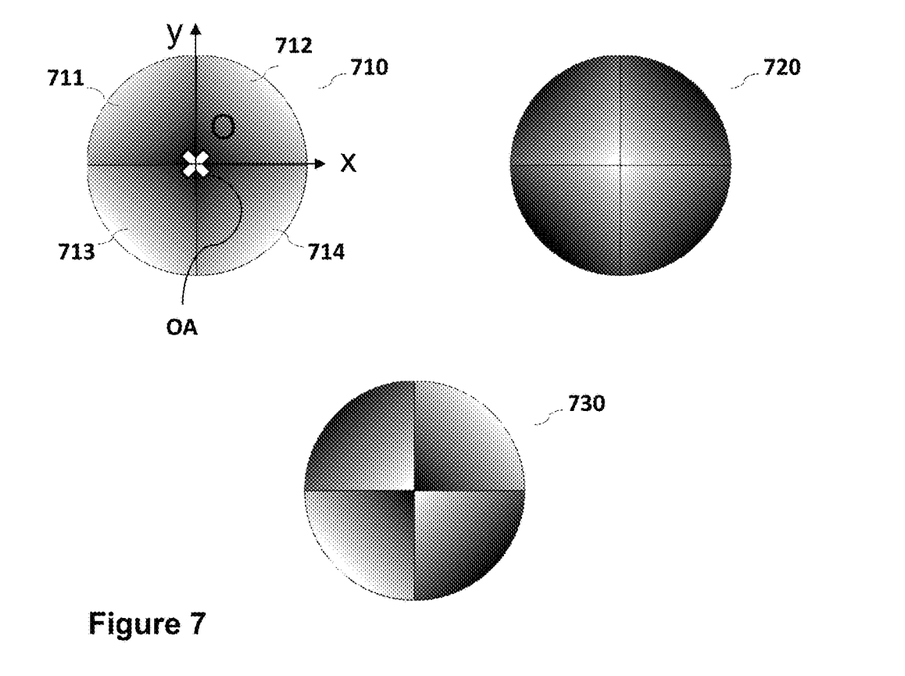
FIG. 7 shows different examples of four-facet prismatic element for use in the imaging device of the present disclosure.

FIG. 7 shows in top view three examples of multi-facet prismatic element 710, 720, 730 for use in the imaging device according to the present disclosure. Each of the prismatic elements 710, 720, 730 has a base and four lateral facets starting from said base and meeting at an apex, the apex passing through the main optical axis OA.

In the figure, the facets are represented in grey areas, whose grey scale is representative of thickness of the prism facet: white is representative of the thinnest part and dark is representative of the thickest part.

Taking the example of the prismatic element 710 in relation with FIGS. 5 and 7. The prismatic element 710 comprises:
a first lateral facet 711 configured to angularly rotate the image-capture axis with respect to the main optical axis OA so as to cover the rotated field-of-view FOV 1;
a second lateral facet 712 configured to angularly rotate the image-capture axis with respect to the main optical axis OA so as to cover the rotated field-of-view FOV 2;
a third lateral facet 713 configured to angularly rotate the image-capture axis with respect to the main optical axis OA so as to cover the rotated field-of-view FOV 3;
a fourth lateral facet 714 configured to angularly rotate the image-capture axis with respect to the main optical axis OA so as to cover the rotated field-of-view FOV 4.

The facets 711, 712, 713, 714 are symmetrically disposed to form a pyramidal-shaped prismatic element having an apex passing through the main optical axis OA. Here each of the facets 711, 712, 713, 714 covers a quarter of the pupil of the main lens 410 and allows creating a sub-image of an expended field-of-view of the scene SCN.

The facets 711, 712, 713, 714 are thus configured to enable the imaging device 400 to capture four rotated field-of-views FOV 1, FOV 2, FOV 3, FOV 4 which partly overlap around the main optical axis OA.

The rotated field-of-views FOV 1, FOV 2, FOV 3, FOV 4 have each an identical angle-of-view and embrace each a distinct field-of-views of the scene SCN rotated from the central field-of-view FOV 0 relative to the main optical axis OA. The black spots on the FIG. 5 represent the image-capture axis associated with each rotated field-of-view captured by the device and the white cross the main lens optical axis. The rotated field-of-views FOV1, FOV 2, FOV 3, FOV 4 captured by the main lens 410 overlap around the main optical axis OA and form an expanded field-of-view covering the central field-of-view FOV 0. Each rotated field-of-view form a partial image of the SCN which is projected onto the photosensor 430 via the micro-lens array 420 simultaneously with the partial images from the other rotated field-of-views.

The function of the multi-facet prismatic element 450 is to form rotated field-of-views of the central field-of-view FOV 0 seen by the main lens 410 as if they are centred on the main optical axis OA. In that way, each rotated field-of-view allows taking advantage of the good optical performances of the main lens in areas of the captured scene usually subject to optical aberrations. Peripheral area of the field-of-view is thus captured with a reduced level of optical aberrations thanks to the multi-facet prismatic element 450.

In addition, the facets of the multi-faceted prismatic element 710 are geometrically arranged as a function of the geometric scheme of ordered array of pixels of the photosensor 430. As illustrated on FIG. 6, the array of pixels is disposed according to an orthogonal arrangement in a plane (O'; x', y') defined by orthogonal axes [O'x'], [O'y']. The facets 711, 712, 713, 714 are symmetrically disposed in relation to each other with respect to orthogonal axes [Ox], [Oy], orthogonal axes [Ox], [Oy] being parallel to orthogonal axes [O'x'], [O'y']. The centre of symmetry of the facets 711, 712, 713, 714 is a point merged with the main optical axis OA.

In the present example, the number of facets is equal to the number of pixels ($k=p_x \times p_y$) covered per micro-lens. The number of facets illustrated here is just a non-limitative example for the purposes of pedagogical description. Of course, a smaller or greater number of facets can be used without departing from the scope of the present disclosure, assuming that the number of facets (m) must be lower than or equal to the number of pixels (k) per micro-lens (i.e. m≤k, with $k=p_x \times p_y$).

Each facet of the multi-facet prismatic element has an angle with the base adapted to angularly deviate the field-of-view captured by the device and form an expanded field-of-view as illustrated in FIG. 5.

Figure 9A:
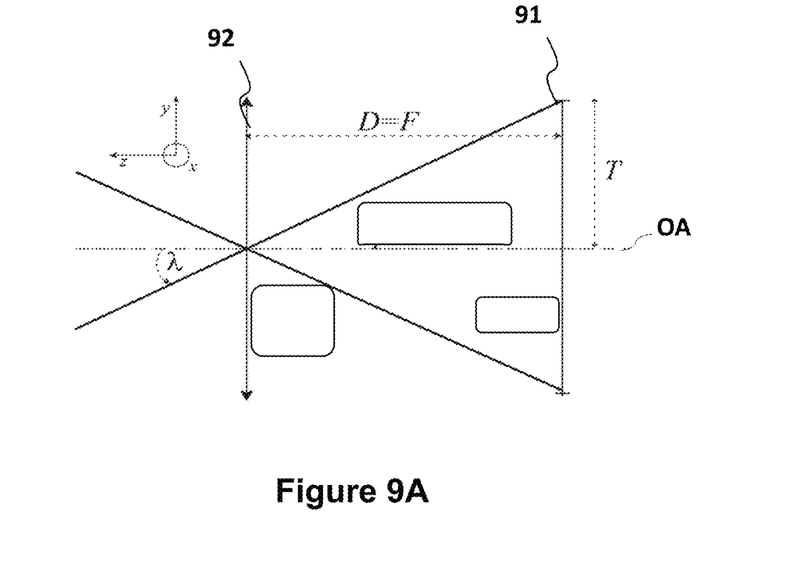
Figure 9B:
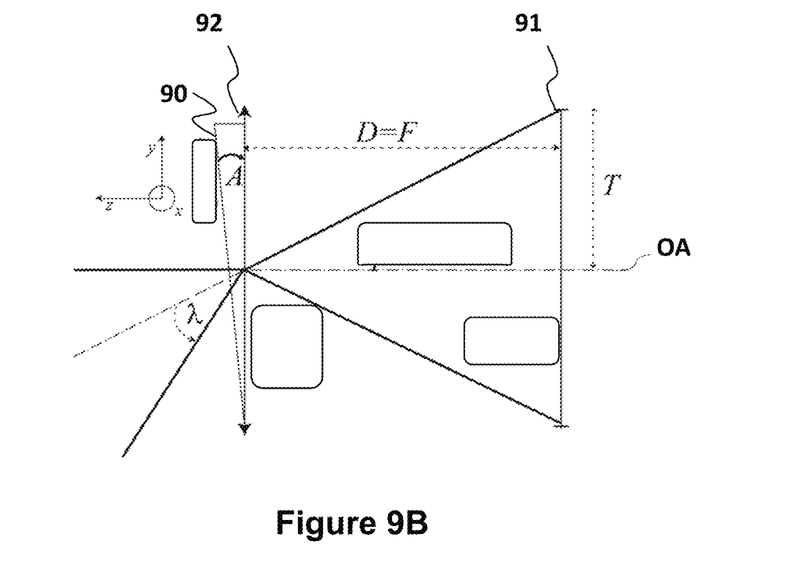

To understand how is determined the angle of rotation of each facet, let's take a camera mounted without a prism as shown in FIG. 9A and mounted with a single prism as shown in FIG. 9B.

The prism 90 is used to deviate the photons captured by the device. The angle A formed with the prisms base is defined so that the angle of rotation of each sub-aperture image permits to expand the field of view of the device. The field-of-view of the camera is given by the size of the photosensor 91 and the focal distance F of the main-lens 92. λ refers to the angle of a half field-of-view of the camera and T refers a half-length of photosensor 91. The main-lens 92 is located at a distance D=F to the sensor. The distance d between the micro-lens array and the sensor is so small that it is not relevant to compute λ. The half field-of-view λ is defined as follow:

$$\lambda = \tan^{-1}(T/D) \quad (1)$$

A prism (or a facet of multi-facet prismatic element) is characterized by an angle of rotation A. The prim is made from a material characterized by a refraction index n. The deviation angle Δ produced by a prism is approximated by Δ=(n−1)A. FIG. 9B shows that the deviation angle of a prism must be equal to the angle λ. The angle of rotation A is defined as follow:

$$A = \frac{1}{n-1} \tan^{-1}\frac{T}{D}) \quad (2)$$

For multi-facet prismatic element, each facet (i,j) is associated with a sub-aperture image S(i,j) and is characterized by a two-component angle of rotation $A_{i,j}$: $A_{i,0}$ is an angle of rotation according to x-axis and $A_{i,0}$ is an angle of rotation according to y-axis in the coordinate system (O; x, y, z). The main optical axis passes through the z-axis. The angle of rotation $A_{i,j}$ for the facet (i,j) is then defined as follow:

$$A_{i,j} = [A_{i,j}^x; A_{i,j}^y] \quad (3)$$

A facet (i,j) is responsible to deviate the photons entering the camera by an angle of $\Delta_{i,j}$ such as:

$$\lambda_{i,j} = \Delta_{i,j} = [\Delta_{i,j}^x; \Delta_{i,j}^y] = \left[\left(i - \frac{u-1}{2}\right)\lambda; \left(j - \frac{u-1}{2}\right)\lambda\right]( \quad (4)$$

with u, the distance between two successive micro-images projected onto the photosensor, the distance being expressed in integer number of pixels. When the micro-lenses are circular in shape (as is the case for the embodiment of FIGS. 4-5), the relation between the distance u between two successive micro-images and the number of pixels k per micro-lens is defined as follow: $u = k^{1/2}$.

Figure 6:
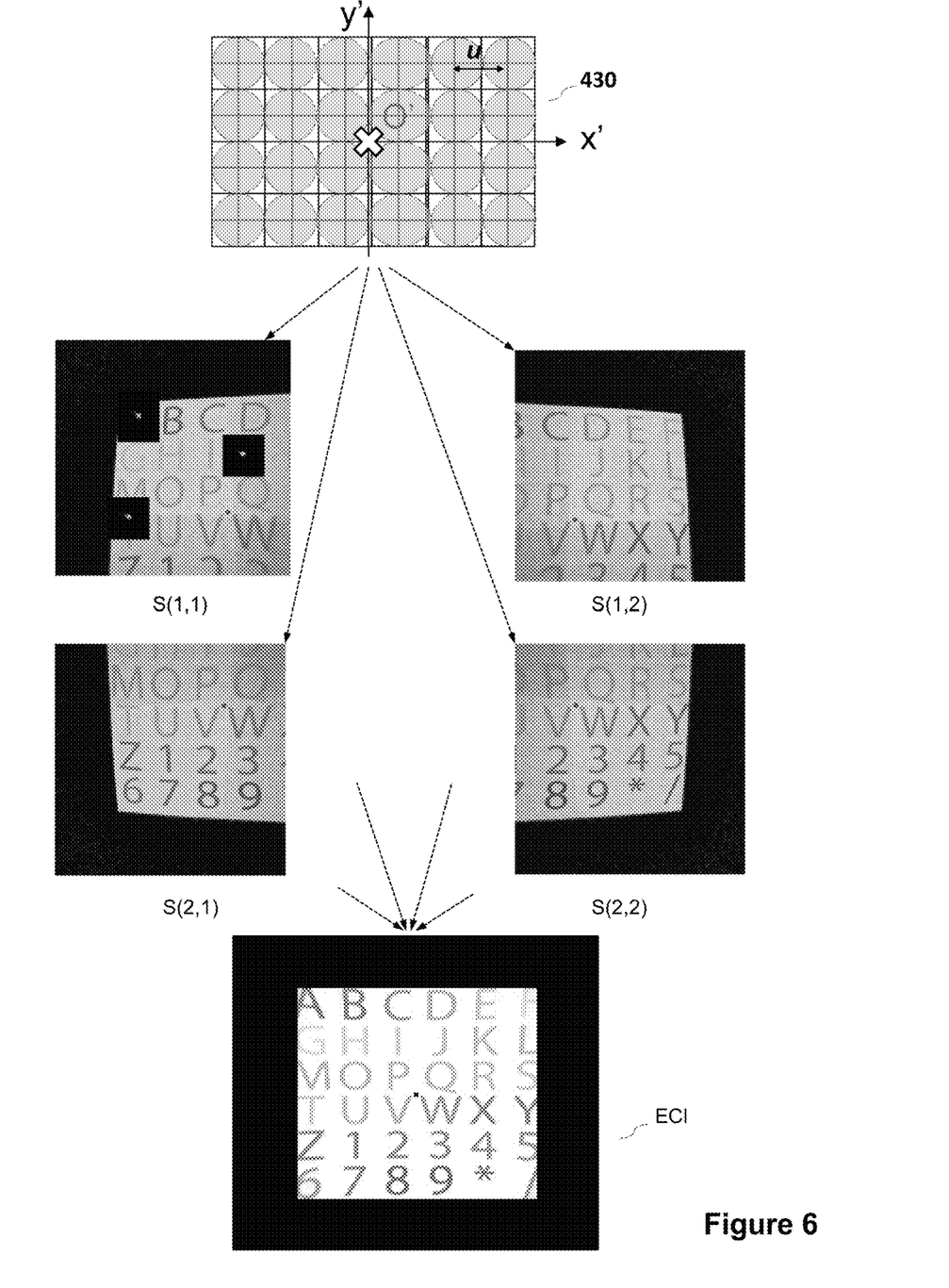
FIG. 6 illustrates a process of constructing a composite image representative of the scene captured by the plenoptic imaging device according to a particular embodiment of the present disclosure.

In the example of FIG. 6, the distance u is equal to 2. The photosensor is designed such that the micro-lenses are covering 2×2 pixels.

Therefore, the angle of rotation $A_{i,j}$ of each facet (i,j) is defined as follow:

$$A_{i,j} = [A_{i,j}^x; A_{i,j}^x] = \frac{1}{n-1}\left[\left(i - \frac{u-1}{2}\right)\lambda; \left(j - \frac{u-1}{2}\right)\lambda\right]( \quad (5)$$

This formula allows to capture rotated field-of-views which are juxtaposed around the main optical axis without overlapping. An angle of rotation smaller than that can be envisaged in case where an overlap of rotated field-of-views is desired, like the particular example of FIGS. 5 and 6.

The angle of rotation $A_{i,j}$ for the facet (i,j) is therefore chosen as a function of the refraction index n of the multi-facet prismatic element, the distance u, the size of the photosensor (T) and the main lens focal distance (F).

Figure 8:
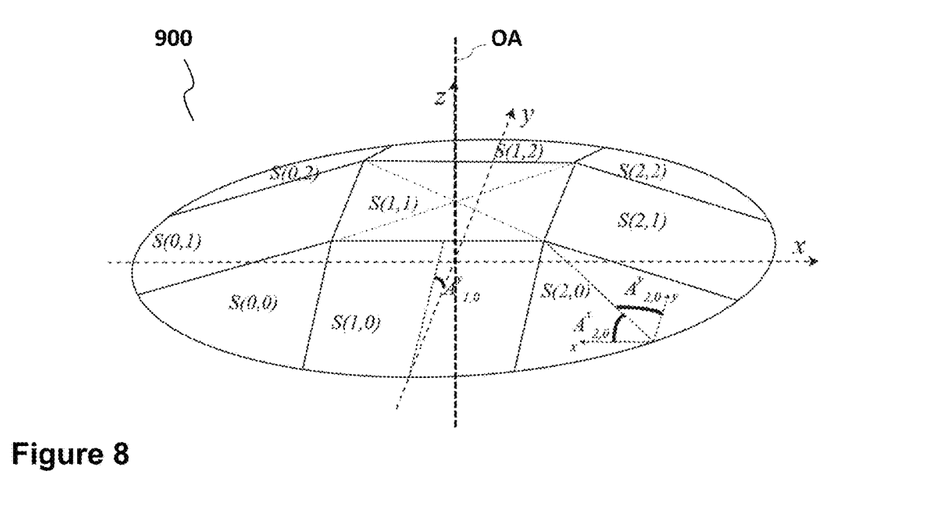
FIG. 8 illustrates another example of nine-facet prismatic element according to a particular embodiment of the disclosure FIGS. 9A and 9B each illustrate a simplified optical schema of a field-of-view captured by an imaging device with or without a single prism, respectively.

To illustrate, the multi-facet prismatic element 800 shown in FIG. 8 has nine facets (i,j) (m=9). This prismatic element 800 has a shape of truncated pyramid. The angle of rotation $A_{i,j}$ associated to each facet (i,j) is computed using the above equation (5), with u=3.

To implement this particular example, the plenoptic imaging device comprises a micro-lens array and a photosensor configured such that each circular micro-lens of the micro-lens array has a diameter to cover a number of pixels k equal to 9 ($k = p_x \times p_y = 3 \times 3$) and the distance u between two successive micro-images formed onto the photosensor is equal to 3 pixels. In that case, each facet is associated with a pixel of a same position in the micro-images.

To implement this particular example, the plenoptic imaging device can also comprise a micro-lens array and a photosensor configured such that each circular micro-lens of the micro-lens array has a diameter to cover a number of pixels k equal to 36 ($k = p_x \times p_y = 9 \times 9$) and the distance u between two successive micro-images formed onto the photosensor is equal to 9 pixels. In that case, each facet is associated with two pixels of same position in the micro-images.

The central facet (1,1) is arranged perpendicularly to the main optical axis OA and passing through the main optical axis OA. The central facet (1,1), which is associated with the sub-aperture image S(1,1), has therefore null angle. In this particular configuration, the central facet allows captured an additional sub-aperture image centred on the optical axis of the imagine device.

The facets illustrated here are designed to form multi-facet prismatic element with a circular base, but one may envisage using a multi-facet prismatic element having a polygonal base without departing from the scope of the disclosure.

The following outlines, in relation with FIG. 6, the procedure to obtain a composite image of the scene SCN captured by the imaging device according to a particular embodiment of the present disclosure.

Taking the exemplary embodiment described in relation with FIGS. 4, 5 and 6. When a picture of the scene is triggered by the imaging device 400, the four-facet prismatic element 450 associated with the main lens 410 form and project a set of four sub-images superposed onto the photosensor 430 via the micro-lens array 420. Each superposed sub-image depicts a certain field-of-view of the scene SCN (FOV 1, FOV 2, FOV 3, FOV 4). Each micro-lens projects a micro-image of said set of four superposed images onto the photosensor 430. We recall here that each micro-lens image depicts an area of the captured scene from the point-of-view of a certain sub-aperture location on the main lens exit pupil.

A processing unit is provided for processing data acquired by the photosensor 430. In an embodiment, such a unit may be embedded in the photosensor 430. In another embodiment, it may be an external unit connected to the photosensor 430.

The processing unit first obtains a light-field content of the scene resulting from the sum of all the micro-images acquired from respective portions of the photosensor 430. Based on this a light-field content, the processing unit performs an extraction of sub-aperture images of the captured scene from different points of view by means of a de-multiplexing method. This method is based on a reorganization of the pixels of this raw image in such a way that all pixels capturing the scene with a certain angle of incidence are stored in a sub-aperture image.

Then, the processing unit extracts, from the light-field content, four sub-aperture images S(1,1), S(1,2), S(2,1), S(2,2). Extracted sub-aperture image S(1,1) is a sub-image associated with the rotated field-of-view FOV 1, extracted sub-aperture image S(1,2) is a sub-image associated with the rotated field-of-view FOV 2, extracted sub-aperture image S(2,1) is a sub-image associated with the rotated field-of-view FOV 3 and extracted sub-aperture image S(2,2) is a sub-image associated with the captured rotated field-of-view FOV 4. As showed in FIG. 6, each extracted sub-aperture image has a good level of sharpness on the whole image with tiny PSF spot diagrams.

The processing unit then builds a composite image CPI of the scene SCN on the basis of four sub-aperture images S(1,1), S(1,2), S(2,1), S(2,2) thus extracted from the light-field content.

First, the processing unit can warp each of the four sub-aperture images S(1,1), S(1,2), S(2,1), S(2,2) according to a predefined distortion model. This allows compensating the geometric default related to the multi-facet prismatic element 450 notably.

Then, the four warped sub-aperture images S(1,1), S(1,2), S(2,1), S(2,2) are assembled using a known stitching method, as that described in the document "*Image Stitching—Comparisons and New Techniques*" of Chia-Yen Chen—October 1998—or that described in the document "*3D and Image Stitching With the Lytro Light-Field Camera*" of William Lu et al.—2013—(Dept. of Comp. Sci., City College of New York, New York, N.Y., 2013), to form an extended and complete image (ECI) of the scene (also called composite image).

The warped sub-aperture images can be easily shifted and assembled into a single image depicting a field-of-view typically four times ($k=p_i \times p_j=2\times2=4$) larger than the central field-of view. The shift mechanisms between sub-aperture images are deduced such that the common objects of the scene visible on two sub-aperture images match the same pixel coordinate in the composite image.

The composite image can be further subject to a reframe process to retain only a desired area of the captured scene.

The composite image CPI thus obtained is an enhanced quality image of the scene SCN captured by the imagine device 400. It has a constant level of sharpness from the center to peripheral regions of the image.

In light of the foregoing, the device according to the invention relies on an image quality enhancing technique combining optical multiplexing and light-field digital data demultiplexing.

Although the present disclosure has been described with reference to one or more examples, workers skilled in the art will recognize that changes may be made in form and detail without departing from the scope of the disclosure and/or the appended claims.

The invention claimed is:

1. A plenoptic imaging device comprising a micro-lens array placed between a main lens and a photosensor, said micro-lens array comprising a plurality of micro-lenses arranged in an image plane of the main lens, each micro-lens being configured to project a micro-image onto the photosensor, said main lens having a main optical axis and an aperture diaphragm plane, said main lens covering a field-of-view of a scene according to a capture axis centered on the main optical axis, called central field-of-view, wherein said plenoptic imaging device comprises multi-faceted optical arrangement having at least two facets and placed in a plane adjacent to the aperture diaphragm plane and centered on the main optical axis, each facet being configured to cover a rotated field of view having a capture axis that is inclined with respect to the main optical axis so that the captured rotated field-of-views form an expanded field-of-view covering said central field-of-view.

2. The plenoptic imaging device according to claim 1, wherein each micro-lens covers at least partially an integer number of pixels of the photosensor, said multi-faceted optical means comprising a number of facets lower than or equal to said integer number of pixels.

3. The plenoptic imaging device according to claim 2, wherein each micro-lens is configured to project micro-images onto the photosensor such that a distance between two successive micro-images projected onto the photosensor is equal to a square root of said integer number of pixels.

4. The plenoptic imaging device according to claim 1, wherein the photosensor comprises an ordered array of pixels arranged according to a geometric scheme and the facets of said multi-faceted optical arrangement are geometrically arranged as a function of said geometric scheme.

5. The plenoptic imaging device according to claim 1, wherein said multi-faceted optical arrangement comprises a multi-facet prismatic element having a base and at least two lateral facets starting from said base and meeting at an apex, said apex passing through the main optical axis.

6. The plenoptic imaging device according to claim 1, wherein said multi-faceted optical arrangement comprises a multi-facet prismatic element having a base and at least two lateral facets starting from said base and meeting at a central facet, said central facet being arranged perpendicularly to and passing through the main optical axis.

7. The plenoptic imaging device according to claim 5, wherein each facet of said multi-facet prismatic element forms an angle with said base that depends on:
- a refraction index of the multi-facet prismatic element,
- the distance between two successive micro-images projected onto the photosensor,
- a dimensional parameter of the photosensor,
- a main lens focal distance.

8. The plenoptic imaging device according to claim 1, comprising a unit configured for:
- extracting sub-images (S(i,j)) from a light-field content resulting from the rotated field-of-views captured on the photosensor via the micro-lens array, each sub-image being associated with one distinct of said rotated field-of-views,
- forming a composite image of the scene based on said extracted sub-images.

* * * * *